(12) United States Patent
Dorn

(10) Patent No.: US 6,700,356 B1
(45) Date of Patent: Mar. 2, 2004

(54) METHOD AND APPARATUS FOR REGULATING THE EXCITATION OF AN ALTERNATOR OF A GENSET

(75) Inventor: Douglas W. Dorn, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 09/695,169

(22) Filed: Oct. 24, 2000

(51) Int. Cl.$^7$ .............. H02P 9/00; H02P 9/14; H02P 9/10

(52) U.S. Cl. .............. 322/44; 322/46; 322/59

(58) Field of Search .............. 322/28, 32, 46, 322/59; 290/40 B

(56) References Cited

U.S. PATENT DOCUMENTS

| | | |
|---|---|---|
| 3,654,484 A | 4/1972 | Jorgenson et al. |
| 3,715,652 A | 2/1973 | Elliston |
| 4,128,771 A | 12/1978 | Domenico |
| 4,208,693 A | 6/1980 | Dickens et al. |
| 4,219,860 A | 8/1980 | DePuy |
| 4,245,182 A | 1/1981 | Aotsu et al. |
| 4,280,060 A | 7/1981 | Kure-Jensen et al. |
| 4,322,630 A | 3/1982 | Mezera et al. |
| 4,326,159 A | 4/1982 | Aotsu et al. |
| 4,330,743 A | 5/1982 | Glennon |
| 4,345,288 A | 8/1982 | Kampf et al. |
| 4,346,337 A | 8/1982 | Watrous |
| 4,368,520 A | 1/1983 | Hwang et al. |
| 4,403,292 A | 9/1983 | Ejzak et al. |
| 4,403,293 A | 9/1983 | Bradt et al. |
| 4,438,385 A | 3/1984 | Sato et al. |
| 4,438,498 A | 3/1984 | Sekel et al. |
| 4,443,828 A | 4/1984 | Legrand et al. |
| 4,477,765 A | 10/1984 | Glennon et al. |
| 4,481,459 A | 11/1984 | Mehl et al. |
| 4,486,801 A | 12/1984 | Jackovich et al. |
| 4,498,016 A | 2/1985 | Earleson et al. |
| 4,527,071 A | 7/1985 | Ausiello |
| 4,533,863 A | 8/1985 | Luhn et al. |
| 4,538,231 A | 8/1985 | Abe et al. |
| 4,550,379 A | 10/1985 | Kawai et al. |

(List continued on next page.)

FOREIGN PATENT DOCUMENTS

| | | |
|---|---|---|
| GB | 2 055 262 A | 7/1980 |
| JP | 60-16195 | 1/1985 |

OTHER PUBLICATIONS

Dorf, Richard C. Bishop, Robert H. Modern Control System (Menlo Park, California, Dec., 1998), pp. 73, 189, 377, 393, 404, 465, 548, 626, 632, 663, 665.*

EE Handbook, 11th Edition, Fink & Beaty, pp. 18–27 through 18–39.

Literature concerning electric motors, found at http://www.friesen.com, printed Mar. 2, 2000.

(List continued on next page.)

*Primary Examiner*—Karl Tamai
*Assistant Examiner*—Julio Cesar Gonzalez
(74) *Attorney, Agent, or Firm*—Quarles & Brady LLP

(57) ABSTRACT

A system and method are disclosed for providing a control signal to control an excitation level of an alternator. The system includes a first calculation element that receives first, second and third indications of first, second and third output voltages of first, second and third phases of the alternator, respectively, and calculates a first feedback signal in dependence upon the received first, second and third indications. The system additionally includes a second calculation element that receives the first indication and calculates a second feedback signal in dependence upon the received first indication. The system further includes an intermediate signal generation element that receives a target input and the first feedback signal, and in response provides an intermediate signal. The system additionally includes a control signal generation element that receives the intermediate signal and the second feedback signal, and in response provides the control signal.

21 Claims, 4 Drawing Sheets

U.S. PATENT DOCUMENTS

| | | |
|---|---|---|
| 4,559,487 A | 12/1985 | Sims et al. |
| 4,583,036 A | 4/1986 | Morishita et al. |
| 4,589,052 A | 5/1986 | Dougherty |
| 4,593,348 A | 6/1986 | Tewesmeier |
| 4,598,373 A | 7/1986 | Morishita et al. |
| 4,602,341 A | 7/1986 | Gordon et al. |
| 4,617,626 A | 10/1986 | Morishita et al. |
| 4,651,081 A | 3/1987 | Nishimura et al. |
| 4,659,977 A | 4/1987 | Kissel et al. |
| 4,670,704 A | 6/1987 | Maehara et al. |
| 4,672,501 A | 6/1987 | Bilac et al. |
| 4,682,097 A | 7/1987 | Matsui |
| 4,701,690 A | 10/1987 | Fernandez et al. |
| 4,714,869 A | 12/1987 | Onitsuka |
| 4,731,547 A | 3/1988 | Alenduff et al. |
| 4,774,855 A * | 10/1988 | Murrell et al. ............. 74/687 |
| 4,777,425 A | 10/1988 | MacFarlane |
| 4,800,291 A | 1/1989 | Bowers |
| 4,839,575 A | 6/1989 | MacFarlane |
| 4,855,664 A | 8/1989 | Lane |
| 4,912,382 A | 3/1990 | Koenig et al. |
| 4,937,561 A | 6/1990 | Sasaki et al. |
| 4,996,646 A | 2/1991 | Farrington |
| 5,006,781 A | 4/1991 | Schultz et al. |
| 5,057,962 A | 10/1991 | Alley et al. |
| 5,117,174 A | 5/1992 | Kessler |
| 5,140,245 A * | 8/1992 | Stacey ..................... 318/723 |
| 5,168,208 A | 12/1992 | Schultz et al. |
| 5,206,776 A | 4/1993 | Bodenheimer et al. |
| 5,216,350 A | 6/1993 | Judge et al. |
| 5,294,879 A | 3/1994 | Freeman et al. |
| 5,298,842 A | 3/1994 | Vanek et al. |
| 5,298,851 A * | 3/1994 | DeNardis .................. 322/28 |
| 5,303,160 A | 4/1994 | Winter et al. |
| 5,305,234 A | 4/1994 | Markus et al. |
| 5,309,312 A | 5/1994 | Wilkerson et al. |
| 5,345,154 A * | 9/1994 | King ........................ 318/49 |
| 5,376,877 A | 12/1994 | Kern et al. |
| 5,390,068 A | 2/1995 | Schultz et al. |
| 5,418,675 A | 5/1995 | Bodenheimer et al. |
| 5,450,268 A | 9/1995 | Phillips et al. |
| 5,451,876 A | 9/1995 | Sandford et al. |
| 5,455,763 A * | 10/1995 | Feingold .................. 364/149 |
| 5,477,827 A | 12/1995 | Weisman, II et al. |
| 5,483,927 A | 1/1996 | Letang et al. |
| 5,486,751 A | 1/1996 | Koenig |
| 5,493,200 A * | 2/1996 | Rozman et al. ............ 322/10 |
| 5,495,162 A * | 2/1996 | Rozman et al. ............ 322/10 |
| 5,504,417 A | 4/1996 | Kern et al. |
| 5,594,322 A * | 1/1997 | Rozman et al. ............ 322/10 |
| 5,615,654 A | 4/1997 | Weisman, II et al. |
| 5,640,060 A | 6/1997 | Dickson |
| 5,701,070 A | 12/1997 | Schultz |
| 5,732,676 A | 3/1998 | Weisman et al. |
| 5,751,532 A | 5/1998 | Kanuchok et al. |
| 5,754,033 A | 5/1998 | Thomson |
| 5,761,073 A | 6/1998 | Dickson |
| 5,847,644 A | 12/1998 | Weisman, II et al. |
| 5,886,504 A | 3/1999 | Scott et al. |
| 5,929,612 A * | 7/1999 | Eisenhaure et al. ........... 322/47 |
| 5,938,716 A | 8/1999 | Shutty et al. |
| 5,978,729 A | 11/1999 | Landes et al. |
| 5,999,876 A | 12/1999 | Irons et al. |
| 6,005,220 A * | 12/1999 | Bunker et al. ......... 219/130.33 |
| 6,018,200 A | 1/2000 | Anderson et al. |
| 6,081,084 A * | 6/2000 | Crecelius ................... 318/254 |
| 6,117,046 A * | 9/2000 | Ota et al. ..................... 477/79 |
| 6,128,489 A * | 10/2000 | Seazholtz et al. ........... 455/432 |
| 6,144,190 A * | 11/2000 | Scott et al. .................. 322/25 |
| 6,222,349 B1 * | 4/2001 | LeRow et al. ............... 322/34 |
| 6,242,884 B1 * | 6/2001 | Lipo et al. .................. 318/808 |

OTHER PUBLICATIONS

Regulation en temps réel d'une génératice asynchrone, Electronique Industrielle, pp. 70–73, avril, No. 86, Paris, France, 1985.

Digital Controller Design Method for Synchronous Generator Excitation and Stabilizer Systems; Part II: Hardware/Software Design and Implementation Results, IEEE Transactions on Power Systems, pp. 638–644, vol. PWRS–2, No. 3, Aug. 1987.

A Working Manual on Molded Case Circuit Breakers, 4th ed., Westinghouse, pp. 162, 16, and 41–43, 3/93.

Literature concerning Automatic Engine Controllers by DynaGen Systems, Inc., found at http://dynagensystems.com, printed Mar. 1, 2000.

Literature concerning Diesel and Gas Generator Set, found at http://www2. savoiapower.com, printed Mar. 2, 2000.

Literature concerning alternators, found at http://www.wai-wetherill.com, printed Mar. 2, 2000.

Protective Relaying Principles and Applications, 2d ed., J. Lewis Blackburn, pp. 248–249, 312–315, and 370–371, 1998.

BE1–50/51B Time Overcurrent Relay, Basler Electric, 5 pages, 6–92 and 7–96.

Generator Protection, Ch. 11, ANSI/IEEE Std 242–1986, pp. 441–451 and 470–471.

Kohler Power Systems literature: form G12–197, 6/96; form G6–34, 2/97; form G11–63, 10/95; form G11–56, 6/94; form G6–35, 3/98; and form TIB–102, 11/97.

System Coordination With Fast–Response Generators, Gordon S. Johnson, Kohler Co., Generator Division, 1983.

* cited by examiner

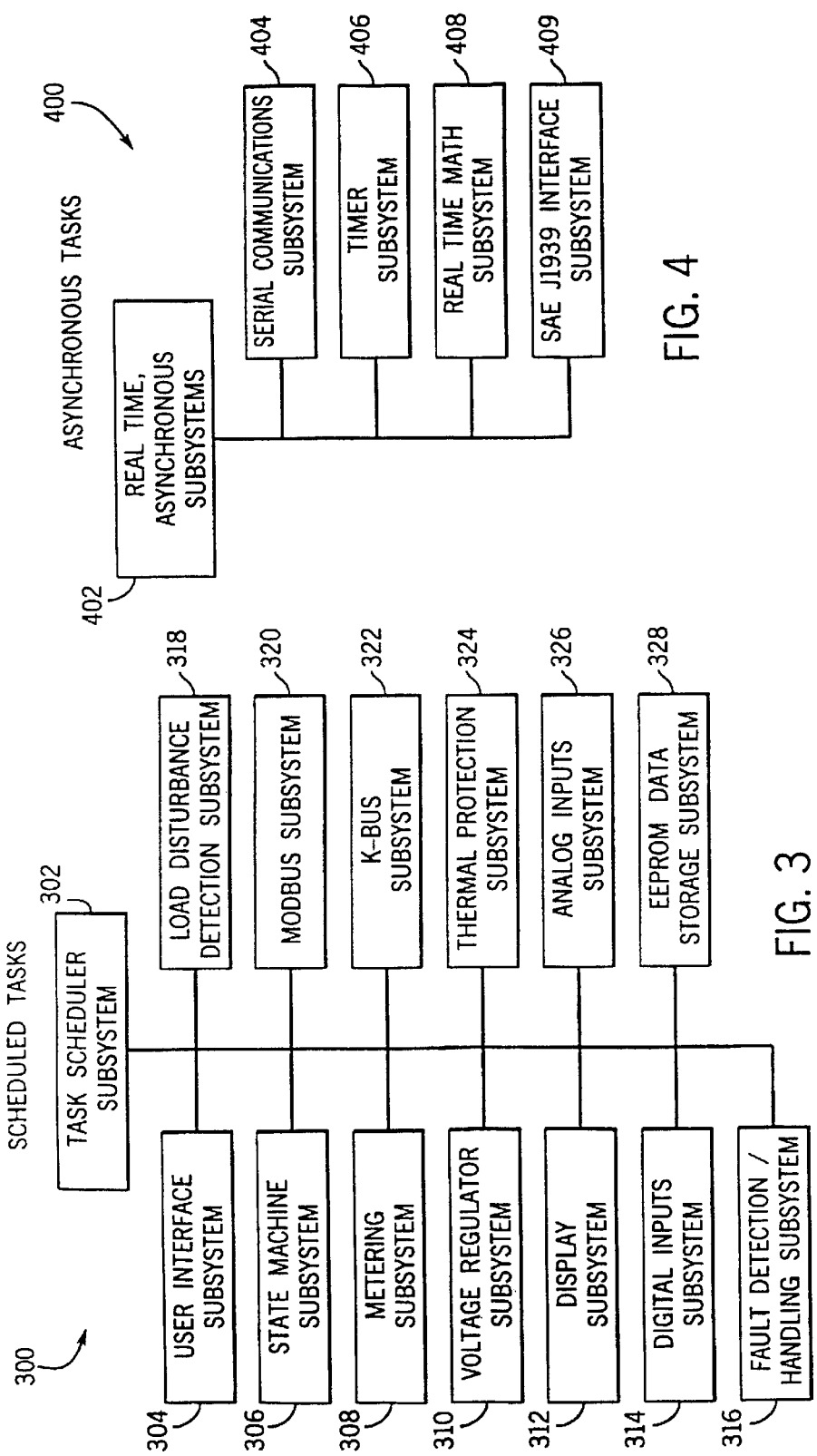

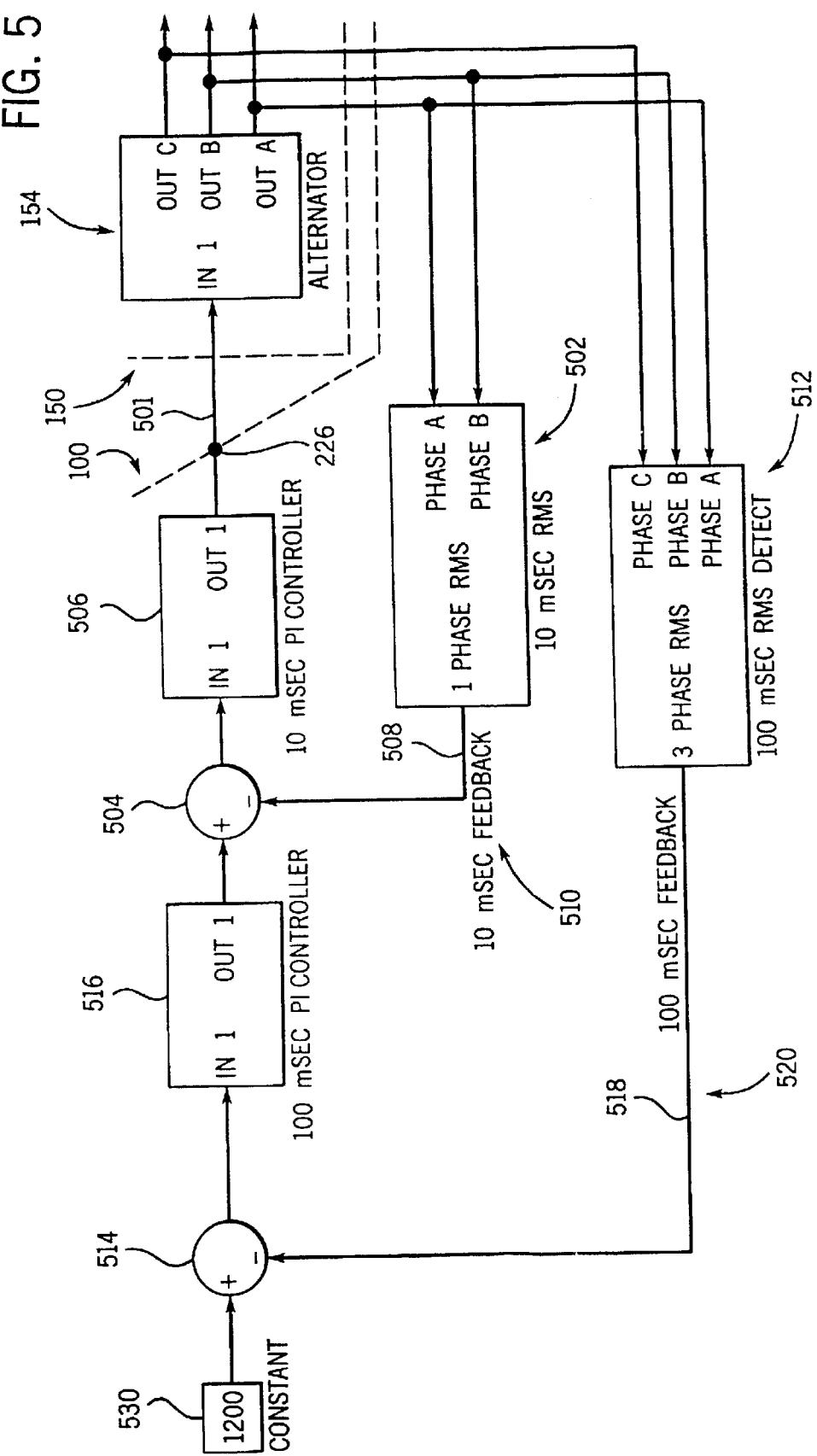

METHOD AND APPARATUS FOR REGULATING THE EXCITATION OF AN ALTERNATOR OF A GENSET

FIELD OF THE INVENTION

The present invention relates to the control of an electric generator set including an engine and an alternator. In particular, the present invention relates to the control of the excitation or field volts (or current) of the alternator within an electric generator set.

BACKGROUND OF THE INVENTION

Electric generator sets (or "gensets") are widely used to provide electric power. A genset typically includes an engine coupled to an alternator, which converts the rotational energy from the engine into electrical energy. The terminal voltage of a genset is proportional to both the magnetic flux density within the alternator, and the speed of the engine. The magnetic flux density is typically determined by controlling the field current, or excitation level, of the alternator, while the speed of the engine is typically determined by an engine governor.

It is typically desirable for a genset to produce an output voltage of a known level, since many loads are designed to receive power at a given voltage level. In particular, the power grid to which gensets are often coupled is designed to maintain particular voltage levels. Because the output voltage of the alternator of a genset is determined in part by the excitation level of the alternator, it is important to be able to control this excitation level. Controlling of the excitation level typically requires feedback information concerning the output voltage of the alternator.

Conventional alternators are typically three-phase machines that output not one but three separate voltages. The output of the alternators can be in a delta format or a wye format. In the case of a wye format, the voltages output from the alternator can be understood as three individual voltages between each given phase output and a neutral or center point of the wye. In the case of a delta format, there is no similar center point, and consequently the voltages are measured only with respect to one another. Because the output voltages from alternators are AC voltages, it is typically necessary to calculate RMS or other DC-equivalent voltages based upon the AC voltages before the information can be utilized to control the excitation level of the alternator. Determining such RMS voltages requires repeated sampling of the AC output voltages of the alternator over significant periods of time, as well as a significant number of time-intensive calculations. Consequently, many conventional genset controllers only determine one RMS voltage associated with one of the three AC output voltages from the alternator, instead of three RMS voltages.

Although such single-phase genset controllers treat the single RMS voltage as a proxy for all three RMS voltages, in reality such an assumption is often incorrect. In particular, the loads placed on the three output terminals of the alternator often can differ significantly from one another, which can produce unbalanced output voltages. As a result, single-phase genset controllers sometimes provide inappropriate control signals for controlling the excitation levels of their alternators due to incomplete information regarding the overall steady-state output of the alternators. For example, if a particular alternator is designed to provide output voltages of 240 Volts (RMS) at each of its terminals but, because of a high current draw at the terminal being measured, outputs only 235 Volts at the terminal being measured, the genset controller may end up causing the other two terminals (that are not being measured) to have voltages higher than 240 Volts when it attempts to cause the voltage of the first terminal to return to 240 Volts.

Although many conventional genset controllers are designed to obtain an indication of alternator output based upon a single output voltage, some conventional genset controllers do indeed determine three RMS or other DC-equivalent voltages that are indicative of, respectively, each of the three AC output voltages of the alternator. In order to determine the three RMS voltages, however, these three-phase genset controllers typically both require a greater amount of processing power and are less responsive, i.e., provide slower control, than the single-phase genset controllers. The greater processing power requirement and slower speed of operation are due to the large number of samples that must be obtained of the output voltages and the processing required to calculate the three RMS voltages based upon these samples.

It would therefore be advantageous if a method and apparatus were developed for regulating the excitation level of an alternator which was more complete and accurate than conventional single-phase genset controllers, and in particular provided greater accuracy under conditions where the three output voltages of the alternator were unbalanced. It would further be advantageous if the method and apparatus was quicker in operation and required less processing power than conventional three-phase genset controllers.

SUMMARY OF THE INVENTION

The present inventors have discovered that a genset controller can more accurately control the armature voltage (or field current or excitation level) of the alternator of a genset by making rapid determinations of the output voltage of one phase of the alternator and, at the same time, making less rapid but more accurate determinations of the output voltage of all three phases of the alternator. The first, rapid determinations concerning the voltage of the single phase of the alternator are used to generate a first feedback signal. The second determinations concerning the voltages of all three phases of the alternator are used to generate a second feedback signal. The second feedback signal is subtracted from a target excitation level, and the difference is then provided to a proportional integral (PI) controller. The first feedback signal is subtracted from the output of the PI controller, and the difference is then provided to an additional PI controller. The output of the additional PI controller is a control signal that is then utilized to control the excitation level of the alternator.

In particular, the present invention relates to a system for providing a control signal to control an excitation level of an alternator. The system includes a first calculation element that receives first, second and third indications of first, second and third output voltages of first, second and third phases of the alternator, respectively, and calculates a first feedback signal in dependence upon the received first, second and third indications. The system additionally includes a second calculation element that receives the first indication and calculates a second feedback signal in dependence upon the received first indication. The system further includes an intermediate signal generation element that receives a target input and the first feedback signal, and in response provides an intermediate signal. The system additionally includes a control signal generation element that receives the intermediate signal and the second feedback signal, and in response provides the control signal.

The present invention further relates to a system for providing a control signal to control an excitation level of an alternator. The system includes an outer loop means for providing a first control signal component based upon a plurality of output voltage indications from the alternator, and an inner loop means for providing a second control signal component based upon at least one of the plurality of output voltage indications from the alternator. The second control signal component provided by the inner loop means is updated at a more frequent rate than the first control signal component provided by the outer loop means.

The present invention additionally relates to a method of controlling an excitation level of an alternator. The method includes receiving first, second and third indications of first, second and third output voltages of first, second and third phases of the alternator, respectively. The method further includes calculating a first feedback signal in dependence upon the received first, second and third indications, and calculating a second feedback signal in dependence upon the received first indication. The method additionally includes determining an intermediate signal in response to a target input and the first feedback signal, determining a control signal in response to the intermediate signal and the second feedback signal, and controlling the excitation level of the alternator in response to the control signal.

BRIEF DESCRIPTION OF THE DRAWINGS

FIG. 3 is a detailed block diagram of synchronous software tasks that are performable by the genset controller of FIG. 1;

FIG. 4 is a detailed block diagram of asynchronous software tasks that are performable by the genset controller of FIG. 1; and FIG. 5 is a block diagram showing the alternator of FIG. 1 along with a schematic representation of functional elements of the genset controller of FIGS. 1–4 that are employed in controlling the excitation level of the alternator of the genset of FIG. 1.

DETAILED DESCRIPTION OF THE PREFERRED EMBODIMENT

Figure 1:
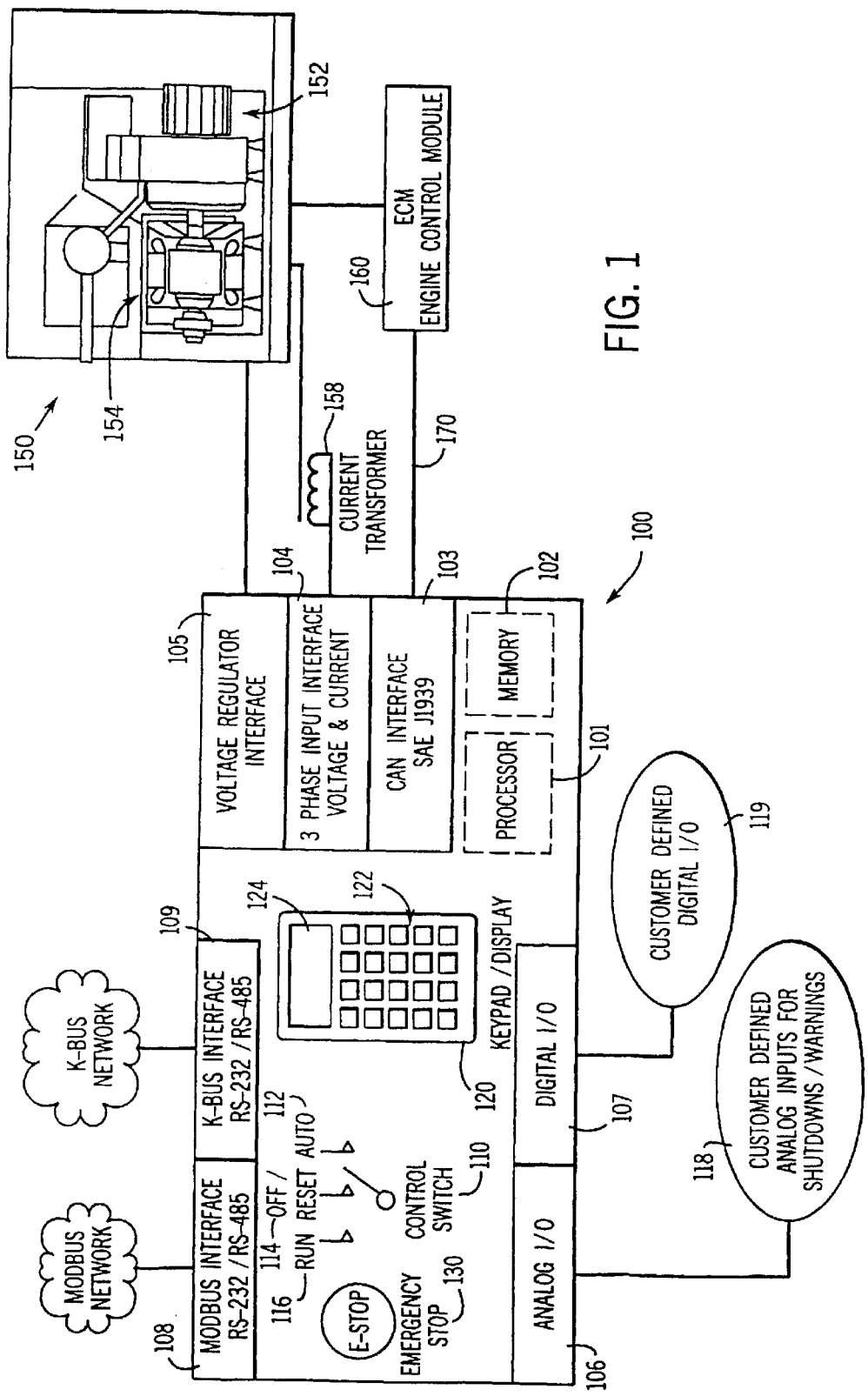
FIG. 1 is a block diagram showing a genset including an alternator, an engine control module, and a genset controller that is capable of controlling the excitation level of the alternator.

Referring to FIG. 1, a generator set controller (or genset controller) 100 is shown coupled to a generator set (genset) 150. Genset controller 100 can be located remotely from genset 150 (up to 40 feet) or attached to the genset directly by way of an engine harness. Genset 150 includes an engine 152 and an alternator (or synchronous generator) 154, and has a typical power rating of between 20 KW and 2000 KW or more. Engine 152 is typically an internal combustion engine that is powered by gasoline, diesel fuel, methane gas or other fuels, for example, the Series 60, Series 2000 or Series 4000 engines manufactured by Detroit Diesel Company of Detroit, Mich. Engine 152 provides torque to a rotor of alternator 154. The rotation of the rotor produces a rotating magnetic field, which induces a voltage at an armature (stator). Alternator 154 is typically a three-phase synchronous machine that outputs three currents and three voltages, such as the Model 5M4027 alternator manufactured by Marathon Electric Company.

Figure 2:
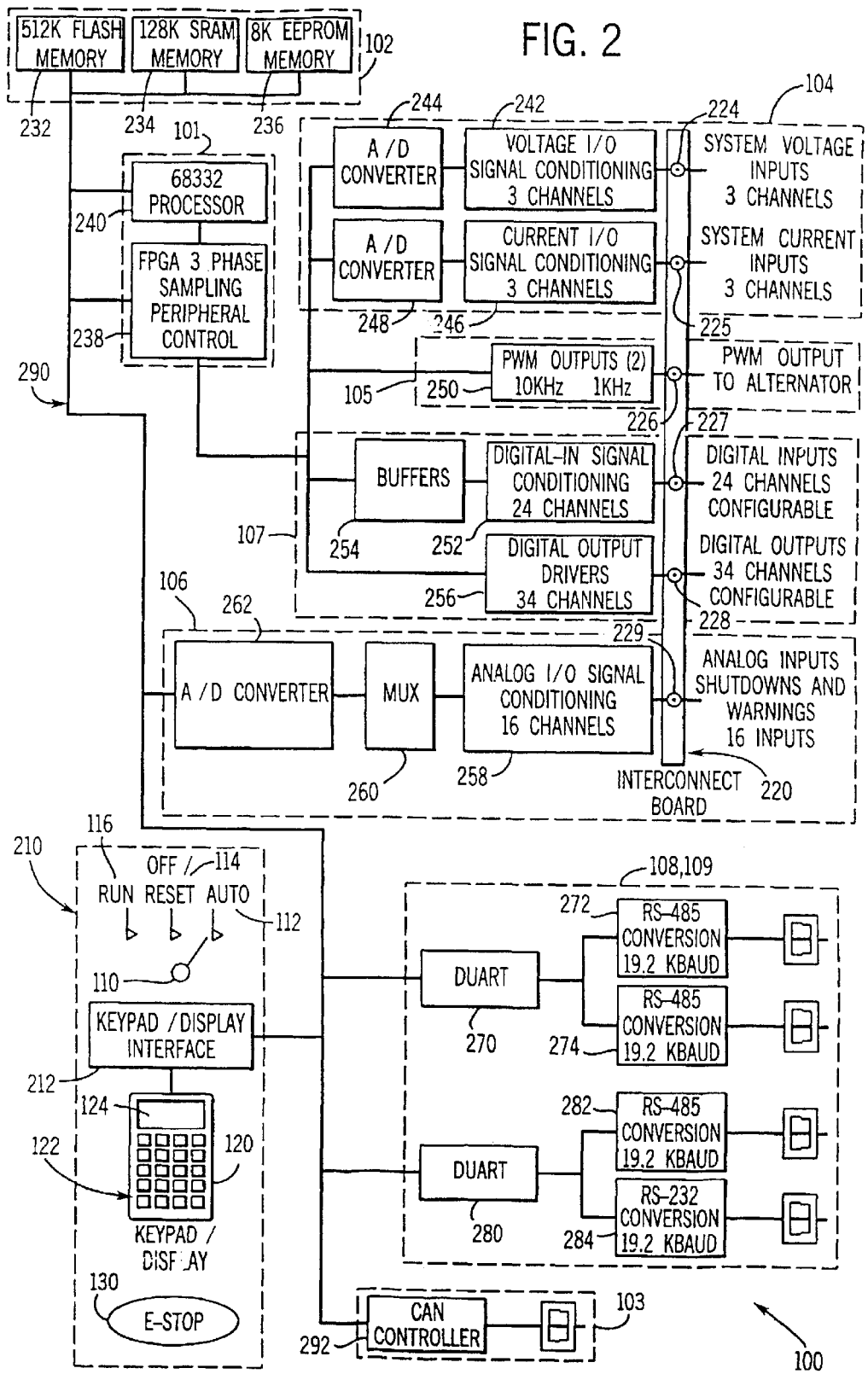
FIG. 2 is a detailed block diagram of the genset controller of FIG. 1.

Genset controller 100 operates to control and monitor the operation of-genset 150. As shown in FIGS. 1 and 2, genset controller 100 is a microprocessor-based (or otherwise computer-driven) system having a processor 101 and a memory 102. Referring to FIG. 2, memory 102 includes a 512 K FLASH memory 232, a 128 K SRAM memory 234, and an BK EEPROM memory 236. Processor 101 includes a microcontroller or microprocessor 240 (e.g., a MC68332 processor manufactured by Motorola, Inc. of Schaumburg, Ill.), and also a field-programmable gate array (FPGA) 238. FPGA 238 allows for memory allocation among memories 232–236. Processor 101 and memory 102 are coupled to one another and other elements of the genset controller 100 by an internal bus structure 290.

Genset controller 100 employs several interfaces to provide control and monitoring of genset 150, including a CAN interface 103, a three-phase input interface 104, a voltage regulator interface 105, an analog input/output interface (analog I/O) 106 and a digital input/output interface (digital I/O) 107. Three-phase input interface 104, voltage regulator interface 105 and digital I/O 107 each are coupled directly to FPGA 238 of processor 101, which allows for signal sampling, signal multiplexing, and control of peripheral devices (such as operator interface devices, discussed below). CAN interface 103 and analog I/O 106 are coupled to processor 101 by way of internal bus 290. Input and output ports for each of interfaces 104–107 are provided on an interconnect board 220 of genset controller 100.

The processor 240 operates under the direction of stored program instructions to read in information through the three-phase input interface 104 regarding the operation of the alternator 154 in the genset 150. Referring to FIGS. 1 and 2, the three-phase alternator output voltages are connected to system voltage inputs 224, and the three-phase alternator output currents are coupled through a current transformer 158 to system current inputs 225. These six analog input signals are filtered by respective voltage and current conditioning circuits 242 and 246 and are digitized by respective voltage and current analog-to-digital converters 244 and 248. These digitized indications of alternator output voltages and currents are read by the processor 240 and used to monitor genset performance. This information may be displayed and it may be used to calculate other genset operating parameters, such as output power, reactive power, power factor and alternator duty level and frequency.

The digitized alternator output signals are also used as the basis for controlling the operation of the alternator 154. As will be described below, the processor 101 is programmed to provide command signals to the voltage regulator interface 105. These commands operate a pulse width modulation (PWM) unit 250 which outputs pulse-width modulated signals to PWM output 226 of interconnect board 220. These PWM signals are applied to alternator 154 to control the voltage, current, and power output levels of the alternator. In particular, voltage regulator interface 105 provides an approximately 10 KHz PWM signal to adjust the field current on alternator 154 to control the armature voltage and maintain the output voltage at a particular level. The determination of this PWM control signal by the genset controller 100 is discussed further in relation to FIG. 5. The voltage regulator interface 105 may also provide a 1 KHz PWM signal for governing engine speed 152, if an ECM is not employed.

In addition to providing control and monitoring of alternator 154, genset controller 100 also provides control and monitoring of engine 152. Although in certain embodiments genset controller 100 directly controls engine 152, in the preferred embodiment genset controller 100 does not directly control the engine. Rather, the operation of engine 152 is directly controlled by an engine control module (ECM) 160, which typically is physically attached to the engine. ECM 160 can control engine speed (and other engine operating parameters), and thereby control the output power of alternator 154. ECM 160 also monitors a variety of engine characteristics, for example, fuel consumption, oil pressure, emissions levels, coolant temperature, time delay engine cool down information, and time delay engine start information.

The genset controller 200 controls and monitors the ECM 160 through CAN interface 103 which connects to the CAN serial link 170. CAN serial link 170, employs the SAE J1939 protocol which is an industry standard protocol for serial communications. By way of CAN databus 170, genset controller 100 receives the information about the operation of engine 152 that has been collected by ECM 160, and provides commands to the ECM 160 to influence the operation of the engine. In particular, upon determining the occurrence of system faults, genset controller 100 provides commands to engine 152 via ECM 160 causing the engine to shutdown, by turning off both the ignition and the cranking of the engine.

The genset controller 100 includes analog I/O 106 and digital I/O 107 which enable it to communicate with a variety of devices. The analog I/O 106 receives up to sixteen separate analog input signals at inputs 229 on interconnect board 220. These analog signals are filtered by conditioning circuit 258, and applied to an A/D converter 262 through a multiplexer 260. The processor 101 can thus sequentially scan the analog inputs and read in digitized signals indicative of engine parameters such as engine temperature, gas emissions and engine battery charge.

The digital I/O 107 receives 24 single-bit TTL signals at digital inputs 227, and produces 34 single-bit TTL signals at digital outputs 228 on interconnect board 220. Digital inputs 227 are coupled to a digital input signal conditioning unit 252, which conditions the input signals and provides the signals to FPGA 238 via buffers 254. Three of the inputs 227 are dedicated to signals relating to emergency stopping, remote starting, and low coolant level of genset 150. The remaining inputs are definable inputs, which can be enabled or disabled, and are coupled to a variety of discrete sensors. The discrete sensors are capable of indicating various types of engine characteristics, warning conditions, and system faults relating to low fuel, or high oil temperature, as well as switchgear conditions concerning the synchronization of the power output of genset 150 with power lines to which the genset is being connected.

Genset controller 100 is capable of performing a variety of functions in response to the signals received at analog inputs 229 and digital inputs 227. In particular, genset controller 100 is capable of scaling the signals, monitoring genset parameters through the use of the signals, detecting system faults, and providing system warnings or system shutdowns in response to the signals. As will be discussed in more detail below, genset controller 100 is also capable of displaying (in real-time).information obtained from the signals, providing relay driver outputs (RDOs)in response to the signals, and relaying information in the signals to remote control and monitoring stations.

The 34 digital outputs 228 are driven by digital output drivers 256. The digital outputs 228 are controlled by the processor acting through FPGA 238. Three digital outputs are dedicated to a Controller Panel Lamp Relay, a Controller Engine Crank Relay, and a Controller Engine Fuel Relay. The remaining digital outputs are definable, and typically are RDOs that determine the on/off status of a variety of indication/warning lamps within a remote control station. The definitions of these digital outputs typically correspond to particular system warnings, shutdowns or other conditions. For example, the definable digital outputs can be RDOs corresponding to "NFPA-110" functions such as overspeed, overcranking, low oil pressure; or high coolant temperature of engine 152. The definable digital outputs can also be RDOs corresponding to loss of signal functions, including a loss of communications with ECM 160. Additionally, the definable digital outputs can be RDOs corresponding to one of many system fault conditions concerning the genset 150 or the genset controller 100 itself.

As shown in FIGS. 1 and 2, genset controller 100 also includes a number of operator interface devices, by which an operator can both provide commands to the genset controller and receive information from the genset controller. The operator interface devices are included on a front panel Man Machine Interface (MMI) 210, which is situated on a controller box. One of the operator interface devices is an emergency stop button 130. Emergency stop button 130 allows an operator to immediately stop the genset 150 by pressing a pushbutton.

A second operator interface device is a keypad/display 120, which includes 16 individual keypads 122 and a vacuum flourescent display (VFD) 124. Keypad/display 120 is coupled to a keypad/display interface 212 in front panel MMI 210, which in turn is coupled to internal databus 290. Keypads 122 allow an operator to enter a variety of information and commands to genset controller 100. VFD 124 is an alphanumeric display, and allows genset controller 100 to display various information concerning system operation and system faults to an operator. A VFD is employed because it provides good visibility over a large range of temperatures and from a wide range of viewing angles.

The operator interface devices further include a control switch 110, which can be rotatably set to one of three positions: an Automatic (Auto) position 112; an Off/Reset position 114; and a Run position 116. Setting the control switch to Run position 116 causes genset controller 100 to send a signal via ECM 160 to start and run the genset 150. Setting control switch 110 to Auto position 112 allows the genset 150 to be started and controlled from a remote location. This mode of operation also allows for time-delayed engine starting and cool-down. Setting control switch 110 to Off/Reset position 114 initiates the immediate shutdown of genset 150 and also results in a resetting of the software of genset controller 100. If a fault occurs that precipitates a system shutdown, an operator must move control switch 110 to Off/Reset position 114 to clear the fault before genset 150 can be started again.

Genset controller 100 also includes other devices which provide information to an operator, including several light-emitting diodes(LEDs) and an alarm horn (not shown). These devices are used to provide system status information to an operator, as well as to alert the operator to the existence of system faults. During the occurrence of some faults, a message concerning the fault or related warning/shutdown condition is displayed on VFD 124, an appropriate warning LED on front panel MMI 210 is turned on, the alarm horn is activated,.and a corresponding RDO is produced at a digital output 228.

As shown in FIG. 1, genset controller 100 is capable of communication with other remote control and monitoring devices via both a K-BUS interface 109 and a second serial interface 108. K-BUS interface 109 provides serial communications using the proprietary K-Bus serial communications protocol. Second serial interface 108 provides serial communications using any of a variety of other "open" serial communications protocols, including the Modbus™ protocol. Each of K-BUS interface 109 and second serial interface 108 is configurable to use either the RS-232 or RS-485 standards.

In the preferred embodiment shown in FIG. 2, the structures associated with K-BUS interface 109 and second serial interface 108 include a first dual universal asynchronous receiver/transmitter (DUART) 270 that is coupled to two RS-485 conversion units 272 and 274, and a second DUART 280 that is coupled to an RS-485 conversion unit 282 and an RS-232 conversion unit 284. Each of DUARTs 270, 280 is coupled to internal databus 290 and is controlled in response to program instructions executed by microcomputer 240.

The microprocessor 240 operates the genset under the direction of programs illustrated in FIGS. 3 and 4. The programs include scheduled tasks which, as illustrated in FIG. 3, are performed one at a time under the direction of a task scheduler program 302. The programs also include asynchronous tasks as illustrated in FIG. 4. The asynchronous tasks are performed in response to interrupts that are managed by a real time, asynchronous program 402.

Referring to FIGS. 3 and 4, two block diagrams 300, 400 are provided showing software based subsystems (or tasks) that are performed by microprocessor 240 of genset controller 100. Through the operation of these subsystems, microprocessor 240 is capable of monitoring genset 150 (as well as capable of monitoring the operation of genset controller 100), receiving operator commands, detecting system faults, providing system warnings and shutdowns when necessary, displaying information at keypad/interface 120 (and at other operator interface devices), and conducting communications with genset 150, ECM 160 and other devices via K-BUS interface 108 and second serial interface 109. The subsystems of block diagrams 300, 400 are self-contained routines that control specific aspects of genset controller 100. Each subsystem is an independent, modular unit with well-defined input/output protocols to communicate with other subsystems.

Block diagram 300 shows scheduled subsystems, which are scheduled according to a task scheduler subsystem 302. The task scheduler subsystem is capable of invoking any subsystem at a rate of up to 100 times a second, and is able to handle transitions between subsystems and to monitor the execution times of subsystems to make sure that subsystems do not exceed their time allotments. As shown, other scheduled subsystems (which are scheduled by task scheduler subsystem 302) include a user interface subsystem 304, a state machine subsystem 306, a metering subsystem 308, a voltage regulator subsystem 310, a display subsystem 312, a digital inputs subsystem 314, and a fault detection/handling subsystem 316. Further, the scheduled subsystems include a load disturbance detection subsystem 318, a Modbus™ (or other serial communications) subsystem 320, a K-BUS subsystem 322, a thermal protection subsystem 324, an analog inputs subsystem 326, and an EEPROM data storage subsystem 328.

Block diagram 400 shows asynchronous subsystems. As shown in block 402, these subsystems operate in real time, asynchronously, with respect to the scheduled subsystems (i.e., operate in the "background" of the scheduled subsystems). The asynchronous subsystems also provide data when the scheduled subsystems require such data. The asynchronous subsystems are interrupt-driven modules and can take advantage of special features of microprocessor 240 (such as the embedded time processing unit within the microprocessor). The asynchronous subsystems include a serial communications subsystem 404, a timer subsystem 406, a real time math subsystem 408 (which employs a time processing unit of microprocessor 240), and a SAE J1939 interface subsystem 409.

Turning to FIG. 5, in accordance with one embodiment of the present invention, the genset controller 100 operates to provide a pulse-width modulated (PWM) control signal 501 to the alternator 154 to control the excitation level of the alternator based upon the output voltages of the alternator. The PWM control signal 501 is output at PWM output 226 as discussed in relation to FIG. 2. Typically, the alternator 154 is controlled to provide an output voltage of either 120 Volts or 139 Volts line-to-neutral (low-wye), or 240 Volts or 277 Volts line-to-neutral (high-wye), for an alternator connected in the three-phase wye configuration. The low-wye voltage is obtained when three pairs of windings of the alternator 154, which typically has six windings in total, are respectively coupled in parallel, while the high-wye voltage is obtained when the three pairs of windings are respectively coupled in series. In the delta format, one of these target output voltage values is increased by a factor of $\sqrt{3}$.

The PWM control signal 501 is provided by the voltage regulator interface 105, and in varying embodiments can be used to control the field volts or field current of the alternator. As discussed, the output voltages of the alternator are provided to the genset controller 100 at the system voltage inputs 224 of the three-phase input interface 104. The genset controller 100 processes the output voltage information received at the three-phase input interface 104 in order to generate the PWM control signal 501. The voltage conditioning circuit 242 and analog-to-digital converter 244 shown in FIG. 2, which convert analog output voltage signals from the alternator into digital signals for processing by the controller 100, are omitted for clarity.

Specifically, the processing of the output voltage information (after conversion into digital form) includes two feedback loops, a 10 millisecond feedback loop 510 and a 100 millisecond feedback loop 520. The 10 millisecond feedback loop 510 at a block 502 operates to determine a 10 millisecond feedback signal 508 equaling (or related to) the RMS output voltage of a single phase of the alternator 154, typically line-to-neutral. Each given calculation of the RMS output voltage is made based upon samples of the AC output voltage taken during a half cycle of rotation of the alternator 154.

As shown in FIG. 5, for an alternator 154 having three output terminals A–C in delta format, the determination of the single RMS output voltage is made by determining the voltage difference between two of those terminals, e.g., between output terminals A and B. In the case of an alternator with output terminals in wye format, the determination of the RMS output voltage is typically made by determining the voltage difference between one of the three output terminals A–C and a neutral voltage terminal or ground terminal/point (not shown), although the determination can also be made by determining the voltage difference between two of the output terminals as well.

With respect to the 100 millisecond feedback loop 520, that feedback loop operates at a block 512 to determine a 100 millisecond feedback signal 518. The 100 millisecond feedback signal 518 is an average of, or otherwise representative of, three RMS output voltages corresponding to the output voltages of each of the three phases of the alternator 154. Thus, block 512 is shown to receive output voltage signals from all three output terminals of the alternator 154. Each calculation of the 100 millisecond feedback signal 518 is based upon samples taken of the three output voltages over three cycles of rotation of the alternator 154. In alternate embodiments, the genset controller 100 at blocks 502 and/or 512 determines the feedback signals 508 and 518, respectively, as equaling or being related to other DC-equivalent-type voltages such as time-average voltage values, peak voltage values, or other indications of the output voltage(s) of the alternator 154, instead of RMS voltage values.

Because only a single RMS value corresponding to the output voltage of a single phase of the alternator 154 is calculated by way of the 10 millisecond feedback loop 510, and because samples of the single output voltage are taken over only a ½ cycle of the alternator, the determination of the 10 millisecond feedback signal 508 can take place at a high rate. Thus, the 10 millisecond feedback signal 508 provided by way of the feedback loop 510 is very current and allows for a higher bandwidth controller. The 10 millisecond feedback loop 510 helps to compensate for rapid transient swings in the output voltage of the single phase that it measures.

In contrast, because three RMS values corresponding to the output voltages of all three phases of the alternator 154 are repeatedly calculated by way of the 100 millisecond feedback loop 520, and because a greater number of samples taken over a greater number of cycles of the alternator are required for calculating these three RMS values, the operation of the 100 millisecond feedback loop 520 takes place at a slower rate. However, while the 100 millisecond feedback signal 518 is less current than the 10 millisecond feedback signal 508, it is more accurate since it is based upon the output voltages of all three phases of the alternator 154 rather than one phase. In particular, the overall value of the 100 millisecond feedback signal 518 is less affected by the existence of an imbalance among the respective output voltages than the value of the 10 millisecond feedback signal 508 potentially can be.

Based upon the feedback signals 508 and 518, the voltage regulator subsystem 310 then determines the PWM control signal 501, as follows. The voltage regulator subsystem 310 includes a base constant value 530, which in the present embodiment is set to 1200, i.e., ten times the desired output voltage of 120 Volts. The 100 millisecond feedback signal 518 is subtracted from the base constant value 530 at a first differencing junction 514, and the difference is then provided to a 100 millisecond proportional integral (PI) controller 516. The output of the PI controller 516 is in turn provided to a second differencing junction 504, at which the 10 millisecond feedback signal 508 is subtracted from the output of the PI controller. This difference is then provided to a 10 millisecond PI controller 506, the output of which is the PWM control signal 501.

The 10 millisecond and 100 millisecond feedback loops 510,520 are in particular able to work in conjunction with one another to counteract steady state imbalances in the output voltages of the three phases of the alternator 154. For example, suppose that the desired output voltages for each of the phases of the alternator 154 is 240 Volts, but the actual output voltage of the first phase is 246 Volts and the output voltages of the remaining two phases are each 237 Volts, due to the application or rejection of an unbalanced load. Assuming that the output voltage for the first phase at 246 Volts is provided to block 502, the 10 millisecond feedback loop 510 rapidly acts to reduce the output voltage at that phase, by reducing the level of PWM control signal 501. However, once the PWM control signal 501 is reduced, the output voltages of each of the remaining two phases are also reduced, causing the average of the three output voltages to fall below 240 Volts. Consequently, the 100 millisecond feedback loop 520 then responds by increasing the PWM control signal 501 (assuming that the base constant value 530 is set appropriately).

The operation of the genset controller in determining the PWM control signal 501 based upon the 100 millisecond and 10 millisecond feedback signals 518, 508 specifically occurs as part of the operation of the voltage regulator subsystem 310 and the metering subsystem 308. The calculation of the RMS values and consequently the feedback signals 508, 518, however, is performed by the real time math subsystem 408. The occurrences of these calculations by the real time math subsystem 408 are asynchronous and depend upon the rotational speed of the alternator 154. The voltage regulator subsystem 310/metering subsystem 308 call the real time math subsystem 408 every 100 milliseconds and 10 milliseconds to obtain the 100 millisecond feedback signal 518 and the 10 millisecond feedback signal 508, respectively.

In alternate embodiments, a variety of parameters of the system can be modified. For example, different types of comparators or other elements can be used in place of differencing junctions 514, 504. Also, different types of controllers such as strictly proportional (P) or proportional-integral-differential (PID) controllers can be employed in place of PI controllers 516, 506, although the PI controllers are preferred insofar as they more accurately control first order systems than P controllers, and are typically less expensive than PID controllers. The base constant value 530 also can be modified to another value or to vary in time. Also, the periods at which the two feedback loops 520, 510 operate can be modified from 100 and 10 milliseconds, as can the numbers of cycles of the alternator that must occur to obtain sufficient information for calculating the feedback signals.

Additionally, the present invention in alternate embodiments can be applied with respect to a variety of different types of alternators in addition to wye-configured and delta-configured alternators, such as alternators having a single-phase configuration, a dog-leg configuration, a zig-zag configuration or a double delta configuration, including configurations where two or more outputs of the alternator 154 are averaged.

Further depending upon the embodiment, the types of feedback signals provided to and from blocks 502, 512 can be equal or related to peak values, average values, or other types of values related to the output voltages of the alternator 154. Also, the number of output voltage phases provided to either loop could be changed. The order of loops 510, 520 cannot be interchanged, however; because of the relative slowness of operation of the 100 millisecond feedback loop 520 in comparison with the 10 millisecond feedback loop 510, a reversal of the order of loops 510,520 would produce a situation in which the 10 millisecond feedback loop would have little or no influence upon the PWM control signal 501.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

What is claimed is:

1. A system for providing a control signal to control an excitation level of an alternator, the system comprising:
   a first calculation element that receives first, second and third indications of first, second and third output voltages of first, second and third phases of the alternator, respectively, and calculates a first feedback signal in dependence upon the received first, second and third indications;
   a second calculation element that receives the first indication and calculates a second feedback signal in dependence upon the received first indication;
   an intermediate signal generation element that receives a target input and the first feedback signal, and in response provides an intermediate signal; and
   a control signal generation element that receives the intermediate signal and the second feedback signal, and in response provides the control signal.

2. The system of claim 1, in which the first feedback signal is calculated at least every 100 milliseconds, and the second feedback signal is calculated at least every 10 milliseconds.

3. The system of claim 1, wherein the first calculation element calculates first, second and third RMS voltages corresponding, respectively, to the first, second and third output voltages during a first time period, and further calculates the first feedback signal as being related to an average of the first, second and third RMS voltages;
   wherein the second calculation element calculates the second feedback signal as being related to a fourth RMS voltage corresponding to the first output voltage during a second time period; and
   wherein the first time period is longer than the second time period.

4. The system of claim 3,
   wherein the system is configured to receive the output voltages of an alternator that is in at least one of a wye configuration, and a delta configuration;
   wherein, when the alternator is in the delta configuration, the indications of the first, second and third output voltages are, respectively, an indication of a voltage difference between the output voltages of a first terminal and a second terminal of the alternator, an indication of a voltage difference between the output voltages of the second terminal and a third terminal of the alternator, and an indication of a voltage difference between the output voltages of the third and the first terminals of the alternator; and
   wherein, when the alternator is in the wye configuration, the indications of the first, second and third-output voltages are indications of voltage differences between at least one of a neutral point and a ground of the alternator and, respectively, the output voltages of a first terminal, a second terminal and a third terminal of the alternator.

5. The system of claim 1, wherein the intermediate signal generation element includes a first comparing element that receives the target input and the first feedback signal, and in response provide a first comparison signal, and a first control element that provides the intermediate signal in response to the first comparison signal; and
   wherein the control signal generation element includes a second comparing element that receives the intermediate signal and the second feedback signal, and in response provides a second comparison signal, and a second control element that provides the control signal in response to the second comparison signal.

6. The system of claim 5,
   wherein each of the comparing elements is a differencing junction.

7. The system of claim 5,
   wherein each of the control elements is at least one of a proportional-integral (PI) controller, a proportional (P) controller, and a proportional-integral-differential (PID) controller.

8. The system of claim 5,
   wherein all of the calculation, comparing, and control elements are included within a genset controller.

9. The system of claim 8, wherein each of the calculation, comparing and control elements are embodied in software within the genset controller.

10. The system of claim 9,
    wherein each of the calculation elements is embodied within a real time math subsystem software routine, and each of the comparing and control elements is embodied within at least one of a voltage regulator subsystem software routine and a metering subsystem software routine.

11. The system of claim 10,
    wherein the first and second calculation elements are respectively called to perform their respective operations by at least one of the voltage regulator subsystem software routine and the metering subsystem software routine every 100 milliseconds and 10 milliseconds, respectively.

12. The system of claim 1,
    wherein the target input is a constant value of 1200.

13. The system of claim 1, wherein the first calculation element calculates first, second and third DC-equivalent voltages corresponding, respectively, to the first, second and third output voltages during a first time period, and further calculates the first feedback signal as being related to an average of the first, second and third DC-equivalent voltages;
    wherein the second calculation element calculates the second feedback signal as being related to a fourth DC-equivalent voltage corresponding to the first output voltage during a second time period; and
    wherein each DC-equivalent voltage is equal to at least one of a time-average voltage and a peak voltage value.

14. The system of claim 1, wherein the first calculation element calculates the first feedback signal based upon the first, second and third output voltages provides during 3 cycles of the alternator, and wherein the second calculation element calculates the second feedback signal based upon the first output voltage provided during a half cycle of the alternator.

15. A method of controlling an excitation level of an alternator, the method comprising:
    receiving first, second and third indications of first, second and third output voltages of first, second and third phases of the alternator, respectively;
    calculating a first feedback signal in dependence upon the received first, second and third indications;
    calculating a second feedback signal in dependence upon the received first indication;
    determining an intermediate signal in response to a target input and the first feedback signal;

determining a control signal in response to the intermediate signal and the second feedback signal; and controlling the excitation level of the alternator in response to the control signal.

16. The method of claim 15, wherein the first feedback signal is calculated at least every 100 milliseconds, and the second feedback signal is calculated at least every 10 milliseconds.

17. The method of claim 15, wherein the calculating of the first feedback signal includes calculating first, second and third DC-equivalent voltages corresponding, respectively, to the first, second and third output voltages during a first time period;

wherein the calculating of the second feedback signal includes calculating a fourth DC-equivalent voltage corresponding to the first output voltage during a second time period; and wherein each DC-equivalent voltage includes at least one of a RMS voltage, a time-average voltage, and a peak voltage.

18. The method of claim 15, wherein the determining of the intermediate signal includes determining a first comparison signal in response to the target input and the first feedback signal, and generating the intermediate signal in response to the first comparison signal; and wherein the determining of the control signal includes determining a second comparison signal in response to the intermediate signal and the second feedback signal, and generating the control signal in response to the second comparison signal.

19. The method of claim 18, wherein each of the intermediate signal and the control signal is generated by at least one of a proportional (P) controller, a proportional-integral (PI) controller, and a proportional-integral-differential (PID) controller.

20. The method of claim 18, wherein each of the first and second comparison signals is determined by a respective differencing junction.

21. The method of claim 15, wherein the first, second and third indications are provided to a genset controller, the first and second feedback signals are calculated by software within the genset controller, the first and second comparison signals are determined by the software, and the intermediate signal and the control signal are generated by the software, wherein the genset controller outputs the control signal at an output port for transmission to the alternator.

* * * * *

UNITED STATES PATENT AND TRADEMARK OFFICE
CERTIFICATE OF CORRECTION

PATENT NO. : 6,700,356 B1
DATED : March 2, 2004
INVENTOR(S) : Douglas W. Dorn

It is certified that error appears in the above-identified patent and that said Letters Patent is hereby corrected as shown below:

Column 4,
Line 7, "BK" should be -- 8K --.

Column 5,
Line 12, "200" should be -- 100 --.

Column 12,
Line 50, "provides" should be -- provided --.

Signed and Sealed this

Twenty-first Day of December, 2004

JON W. DUDAS
*Director of the United States Patent and Trademark Office*